No. 694,745. Patented Mar. 4, 1902.
F. HALL.
BAKING PAN.
(Application filed June 29, 1901.)
(No Model.)
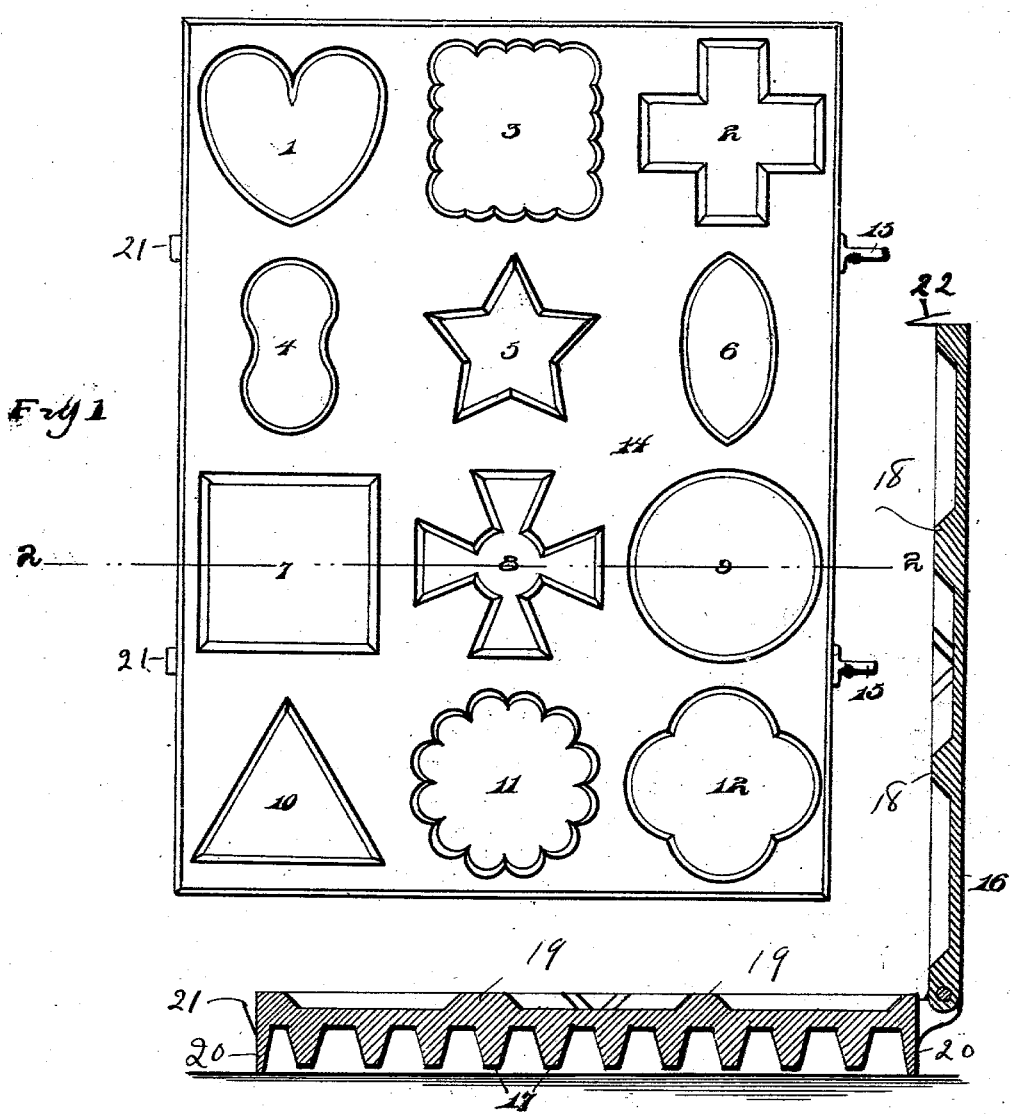

UNITED STATES PATENT OFFICE.

FRANCES HALL, OF STEUBENVILLE, OHIO.

BAKING-PAN.

SPECIFICATION forming part of Letters Patent No. 694,745, dated March 4, 1902.

Application filed June 29, 1901. Serial No. 66,501. (No model.)

*To all whom it may concern:*

Be it known that I, FRANCES HALL, a citizen of the United States of America, residing at Steubenville, in the county of Jefferson and State of Ohio, have invented certain new and useful Improvements in Baking-Pans; and I do hereby declare the following to be a full, clear, and exact description thereof, reference being had to the accompanying drawings, which form a part of this specification.

This invention relates to certain new and useful improvements in bake-pans, and has for its object the provision of novel means whereby a number of cakes of different designs may be baked in one pan; furthermore, to construct a pan that is composed of two parts hinged together.

A still further object of my new bake-pan is to construct the pan in such a manner that it will not come in direct contact with the top of the stove, thereby preventing the dough from burning.

Another object of the invention is to construct a pan whereby the same will allow the circulation of air under the bottom of the pan, which will present advantages in baking.

The invention further contemplates to construct a pan of this character that will be extremely simple in construction, strong, durable, and comparatively inexpensive to manufacture; furthermore, one that will be highly efficient in its use.

With the above and other objects in view the invention consists in the novel combination and arrangement of parts to be hereinafter more fully described, and specifically pointed out in the claim.

In describing the invention in detail reference is had to the accompanying drawings, forming a part of this specification, and wherein like numerals of reference indicate corresponding parts throughout the several views, in which—

Figure 1 is a top plan view of my improved bake-pan. Fig. 2 is a vertical sectional view, taken on the line 2 2 of Fig. 1, showing the one section in a vertical position. Fig. 3 is a fragmentary underneath plan view of the pan.

In these drawings the reference-numerals 1 2 3 4 5 6 7 8 9 10 11 12 indicate different designs that may be placed in the body portion of the pan 14, said pan being provided with hinges 15 to receive the hinged section or cover 16, which when closed rests on the bottom 19. On the opposite edges of the base portion are sockets 21, which receive the spurs 22 on the edge of the cover. The reference-numeral 17 indicates a series of downwardly-extending conical-shaped solid lugs with truncated ends formed integral with the bottom of the pan 14. These lugs are shorter than the legs 20, leaving a slight space intervening between same and the bottom of a stove on which the pan is adapted to rest and becoming highly heated will greatly assist in the baking.

The operation and many advantages obtained by the use of my improved device will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

A baking-pan comprising a base portion having a flange about its lower edge, a series of downwardly-extended solid truncated cones on the under surface of said base portion, the lower ends of said cones being above the plane of the lower edge of said flange, which surrounds same, molds formed in the upper surface of said base portion, sockets on the edge of the latter combined with the cover having a series of complemental mold-sections, the free edge of said cover having spurs which are adapted to enter said sockets when the cover is closed, as shown and described.

In testimony whereof I have hereunto affixed my signature in the presence of two subscribing witnesses.

FRANCES HALL.

Witnesses:
WALTER C. TAYLOR,
C. H. SNIDER.